United States Patent
Xu et al.

(10) Patent No.: US 12,543,191 B2
(45) Date of Patent: Feb. 3, 2026

(54) UPLINK COMMUNICATION VALIDATION FOR FRAME BASED EQUIPMENT MODE IN NEW RADIO-UNLICENSED (NR-U)

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/906,905

(22) PCT Filed: Apr. 20, 2020

(86) PCT No.: PCT/CN2020/085527
§ 371 (c)(1),
(2) Date: Sep. 21, 2022

(87) PCT Pub. No.: WO2021/212257
PCT Pub. Date: Oct. 28, 2021

(65) Prior Publication Data
US 2023/0125461 A1 Apr. 27, 2023

(51) Int. Cl.
*H04W 72/232* (2023.01)
*H04W 72/12* (2023.01)
*H04W 74/0833* (2024.01)

(52) U.S. Cl.
CPC ......... *H04W 72/232* (2023.01); *H04W 72/12* (2013.01); *H04W 74/0833* (2013.01)

(58) Field of Classification Search
None
See application file for complete search history.

(56) References Cited

U.S. PATENT DOCUMENTS

2019/0335456 A1 10/2019 Yerramalli et al.
2020/0037354 A1* 1/2020 Li .................. H04W 74/0808
(Continued)

FOREIGN PATENT DOCUMENTS

CN    109565403 A    4/2019
IN    201937024952 A  8/2019
(Continued)

OTHER PUBLICATIONS

Zte et al., "Remaining Issues on DL Reference Signals and Channels Design for NR-U", 3GPP TSG RAN WG1 Meeting #99, R1-1911820, Reno, USA, Nov. 18, 2019-Nov. 22, 2019, pp. 1-12.
(Continued)

*Primary Examiner* — Clemence S Han
(74) *Attorney, Agent, or Firm* — Harrity & Harrity LLP

(57) ABSTRACT

Wireless communications systems and methods related frame based equipment (FBE) communications in a wireless communication network are provided. For example, a method of wireless communication performed by a user equipment can include: monitoring, in a search space of a shared radio frequency band, for a downlink communication from a base station operating in a frame based equipment (FBE) mode; receiving, from the base station based on the monitoring, downlink control information (DCI); determining, based on the received DCI, the DCI does not schedule a physical downlink shared channel (PDSCH) communication for the user equipment; and transmitting, to the base station based on the determining, an uplink communication.

34 Claims, 11 Drawing Sheets

(56) References Cited

U.S. PATENT DOCUMENTS

| | | | |
|---|---|---|---|
| 2022/0086896 A1* | 3/2022 | Takahashi | H04W 72/1268 |
| 2022/0095371 A1* | 3/2022 | Oh | H04W 74/08 |
| 2024/0073887 A1* | 2/2024 | Bae | H04W 72/535 |

FOREIGN PATENT DOCUMENTS

| | | |
|---|---|---|
| WO | 2019099738 A1 | 5/2019 |
| WO | 2019212898 | 11/2019 |
| WO | 2020027533 A1 | 2/2020 |

OTHER PUBLICATIONS

International Search Report and Written Opinion—PCT/CN2020/085527—ISA/EPO—Jan. 19, 2021.

Qualcomm Incorporated: "TP for Initial Access and Mobility Procedures for NR Unlicensed", 3GPP TSG RAN WG1 Meeting #100e, R1-2000957, Mar. 6, 2020 (Mar. 6, 2020), 8 Pages, the whole document.

Qualcomm Incorporated: "Channel Access Procedures for NR Unlicensed", 3GPP Draft, 3GPP TSG RAN WG1 Meeting #99, R1-1912938, Reno, USA, Nov. 18-Nov. 22, 2019, Nov. 8, 2019 (Nov. 8, 2019), XP051823701, Retrieved from the Internet: URL: https://ftp.3gpp.org/tsg_ran/WG1_RL1/TSGR1_99/Docs/R1-1912938.zip. R1-1912938 7.2.2.2.1 Channel access procedures for NR unlicensed.docx [retrieved on Nov. 9, 2019] section 2.1, Proposal 7 the Whole Document pp. 1-18, chapter 2.2.

Supplementary European Search Report—EP20932162—Search Authority—The Hague—Dec. 4, 2023.

Zte, et al., "Considerations on DL Reference Signals and Channels Design for NR-U", 3GPP TSG RAN WG1 Meeting #98bis, R1-1909972, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019, 8 Pages, XP051808913, Chapter 2.2 UE COT detection for FBE, Chapter 2.3 COT Structure Indication, section 2.2.

* cited by examiner

UPLINK COMMUNICATION VALIDATION FOR FRAME BASED EQUIPMENT MODE IN NEW RADIO-UNLICENSED (NR-U)

CROSS-REFERENCE TO RELATED APPLICATIONS

The present application is a 35 U.S.C. 371 National Phase entry of Patent Cooperation Treaty (PCT) Application No. PCT/CN2020/085527, filed Apr. 20, 2020, which is hereby expressly incorporated herein by reference in its entirety.

TECHNICAL FIELD

This application relates to wireless communication systems, and more particularly to frame based equipment (FBE) communications in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. There are two types of LBT procedures, a load based equipment (LBE)-based LBT and a frame based equipment (FBE)-based LBT. In LBE-based LBT, channel sensing is performed at any time instant and random back-off is used if the channel is found busy. In FBE-based LBT, channel sensing is performed at predetermined time instants (e.g., associated with fixed frame periods (FFPs)). For instance, if the channel is busy, a transmitting node may back off for a predetermined time period and sense the channel again after this period.

In some instances of FBE operation, only a BS can initiate communications in a FFP based on a successful FBE-based LBT. Accordingly, in such instances a UE must successfully receive a downlink communication from the BS prior to attempting an uplink communication. However, some UEs can detect only certain types of downlink signals and/or the downlink signals may have a format that results in a relatively large payload, which can lead to spectral inefficiencies, increased latency, and lower user satisfaction. As a result, there is a need for improved FBE uplink communication protocols and techniques.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some instances, when operating in a frame based equipment (FBE) mode, user equipment (UE) uplink transmissions within a fixed frame period (FFP) can only occur if a downlink signal/channel (e.g., PDCCH, SSB, PBCH, RMSI, GC-PDCCH, etc.) is received from a base station (BS) within the FFP. In this manner, the BS acts as an initiating device, and the UE acts as a responding device. While a UE operating in idle mode may be aware the BS is operating in the FBE mode (e.g., from SIB-1), the UE may only be able to detect downlink signals (e.g., SSB or PDCCH) masked with system information radio network temporary identifier (SI-RNTI). However, in some instances the SSB and/or the PDCCH masked with SI-RNTI can only be transmitted in predefined slots. As a result, the BS may not be able to transmit a downlink signal that the idle mode UE can detect within the FFP. This problem is exacerbated as the length of the FFP becomes shorter (e.g., 1 ms) because it becomes more likely that a predefined slot for transmission of the SSB and/or the PDCCH masked with SI-RNTI will not be within the FFP. Accordingly, opportunities for the idle mode UE to establish a radio resource control (RRC) connection with the BS may be missed due to these factors. Further, for a UE operating in connected mode, monitoring for, detecting, and decoding a downlink communication with a relatively large payload to determine that the UE can transmit an uplink communication in the FFP can be an inefficient use of network resources and increase the processing load on the UE, which can result in unwanted or premature UE power depletion.

The present disclosure provides solutions to these issues. For example, in some instances a base station transmits downlink control information (DCI) with content indicating that there is no associated physical downlink shared channel (PDSCH) communication scheduled. The UE can process the DCI and determine, based on no PDSCH communication being scheduled by the DCI, that the UE can transmit an uplink communication in the FFP. For a UE operating in idle mode, the uplink communication can be a physical random access channel (P-RACH) communication (e.g., a random access preamble (Msg1), a connection request (Msg3), a MsgA, etc.) and/or another type of uplink communication. For a UE operating in connected mode, the uplink communication can be a physical uplink control channel (PUCCH) communication, a physical uplink shared channel (PUSCH) communication, a sounding reference signal (SRS), and/or another type of uplink communication. In some instances, the DCI uses an existing DCI format (e.g., 0_1, 0_2, 1_2, etc.), which can avoid the need for additional configuration(s) and/or signaling for implementation. In some instances, the DCI indicates a PDSCH communication is not scheduled for the user equipment using one or more fields in the DCI. For example, a frequency domain resource allocation (FDRA) field can indicate that a PDSCH communication is not scheduled (e.g., all zeros for RA Type 0, all ones for RA Type 1, etc.).

In an aspect of the disclosure, a method of wireless communication performed by a user equipment includes monitoring, in a search space of a shared radio frequency band, for a downlink communication from a base station operating in a frame based equipment (FBE) mode; receiving, from the base station based on the monitoring, downlink control information (DCI); determining, based on the received DCI, the DCI does not schedule a physical downlink shared channel (PDSCH) communication for the user equipment; and transmitting, to the base station based on the determining, an uplink communication.

In an additional aspect of the disclosure, method of wireless communication performed by a base station includes transmitting, in a search space of a shared radio frequency band operating in a frame based equipment (FBE) mode, downlink control information (DCI), wherein the DCI does not schedule a physical downlink shared channel (PDSCH) communication for a user equipment; and receiving, from the user equipment, an uplink communication based on the DCI.

In an additional aspect of the disclosure, a user equipment includes a transceiver; and a processor in communication with the transceiver such that the transceiver and the processor are configured to: monitor, in a search space of a shared radio frequency band, for a downlink communication from a base station operating in a frame based equipment (FBE) mode; receive, from the base station based on the monitoring, downlink control information (DCI); determine, based on the received DCI, the DCI does not schedule a physical downlink shared channel (PDSCH) communication for the user equipment; and transmit, to the base station based on the determining, an uplink communication.

In an additional aspect of the disclosure, a base station includes a transceiver configured to: transmit, in a search space of a shared radio frequency band operating in a frame based equipment (FBE) mode, downlink control information (DCI), wherein the DCI does not schedule a physical downlink shared channel (PDSCH) communication for a user equipment; and receive, from the user equipment, an uplink communication based on the DCI.

In an additional aspect of the disclosure, a user equipment (UE) includes means for monitoring, in a search space of a shared radio frequency band, for a downlink communication from a base station operating in a frame based equipment (FBE) mode; means for receiving, from the base station based on the monitoring, downlink control information (DCI); means for determining, based on the received DCI, the DCI does not schedule a physical downlink shared channel (PDSCH) communication for the user equipment; and means for transmitting, to the base station based on the determining, an uplink communication.

In an additional aspect of the disclosure, a base station (BS) includes means for transmitting, in a search space of a shared radio frequency band operating in a frame based equipment (FBE) mode, downlink control information (DCI), wherein the DCI does not schedule a physical downlink shared channel (PDSCH) communication for a user equipment; and means for receiving, from the user equipment, an uplink communication based on the DCI.

In an additional aspect of the disclosure, a non-transitory computer-readable medium having program code recorded thereon for wireless communication by a user equipment includes code for causing the user equipment to monitor, in a search space of a shared radio frequency band, for a downlink communication from a base station operating in a frame based equipment (FBE) mode; code for causing the user equipment to receive, from the base station based on the monitoring, downlink control information (DCI); code for causing the user equipment to determine, based on the received DCI, the DCI does not schedule a physical downlink shared channel (PDSCH) communication for the user equipment; and code for causing the user equipment to transmit, to the base station based on the determining, an uplink communication.

In an additional aspect of the disclosure, a non-transitory computer-readable medium having program code recorded thereon for wireless communication by a base station includes code for causing the base station to transmit, in a search space of a shared radio frequency band operating in a frame based equipment (FBE) mode, downlink control information (DCI), wherein the DCI does not schedule a physical downlink shared channel (PDSCH) communication for a user equipment; and code for causing the base station to receive, from the user equipment, an uplink communication based on the DCI.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
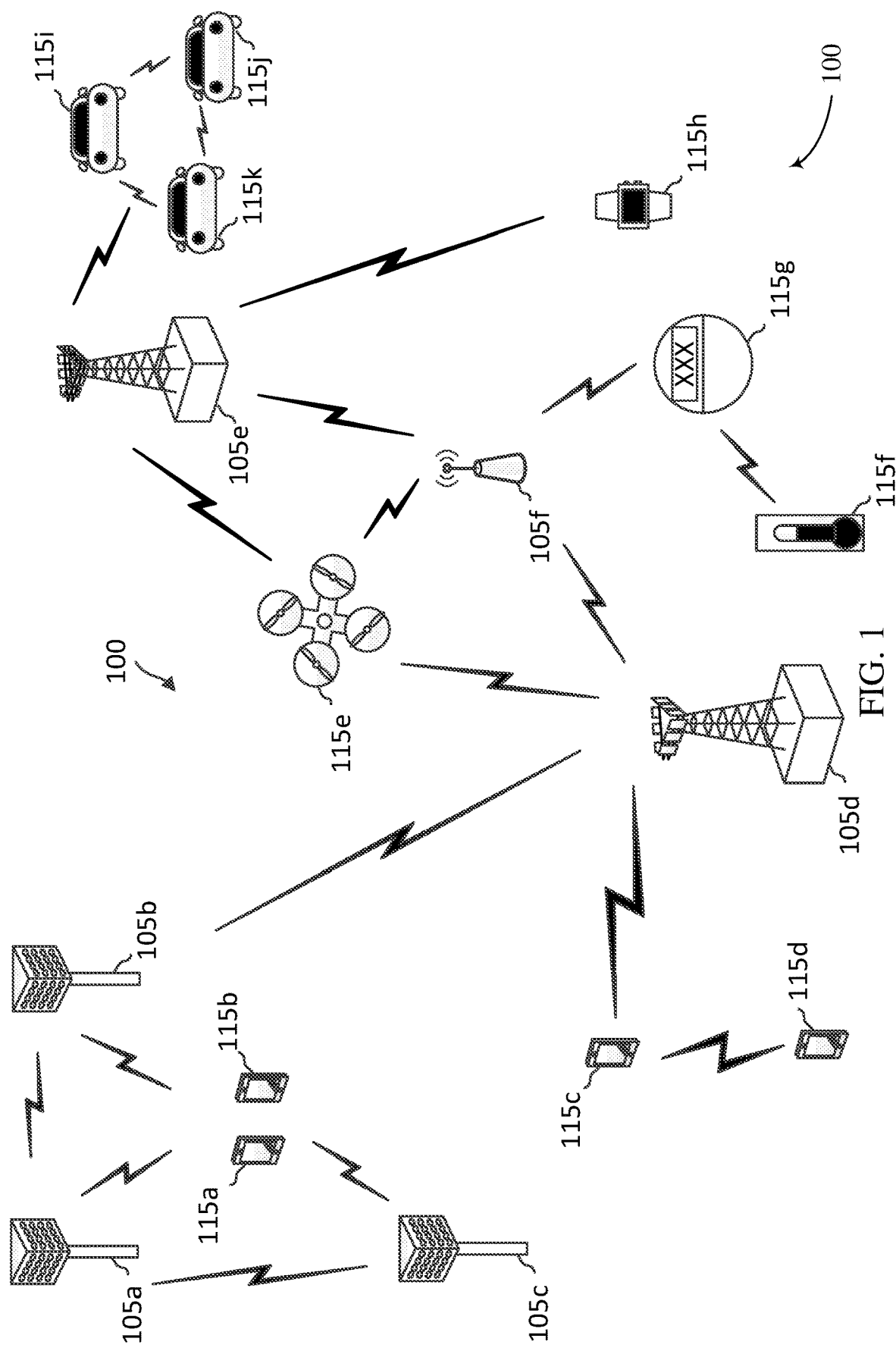
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for facilitating efficient uplink communication scheduling in a frame based equipment (FBE) mode over a shared radio frequency band, including new radio-unlicensed (NR-U). In some instances, when operating in a FBE mode, user equipment (UE) uplink transmissions within a fixed frame period (FFP) can only occur if a downlink signal/channel (e.g., PDCCH, SSB, PBCH, RMSI, GC-PDCCH, etc.) is received from a base station (BS) within the FFP. In this manner, the BS acts as an initiating device, and the UE acts as a responding device. While a UE operating in idle mode may be aware the BS is operating in the FBE mode (e.g., from SIB-1), the UE may only be able to detect downlink signals (e.g., SSB or PDCCH) masked with system information radio network temporary identifier (SI-RNTI). However, in some instances the SSB and/or the PDCCH masked with SI-RNTI can only be transmitted in predefined slots. As a result, the BS may not be able to transmit a downlink signal that the idle mode UE can detect within the FFP. This problem is exacerbated as the length of the FFP becomes shorter (e.g., 1 ms) because it becomes more likely that a predefined slot for transmission of the SSB and/or the PDCCH masked with SI-RNTI will not be within the FFP. Accordingly, opportunities for the idle mode UE to establish a radio resource control (RRC) connection with the BS may be missed due to these factors. Further, for a UE operating in connected mode, monitoring for, detecting, and decoding a downlink communication with a relatively large payload to determine that the UE can transmit an uplink communication in the FFP can be an inefficient use of network resources and increase the processing load on the UE, which can result in unwanted or premature UE power depletion.

As described in detail below, the present disclosure provides solutions to these issues. For example, in some instances a base station transmits downlink control information (DCI) with content indicating that there is no associated physical downlink shared channel (PDSCH) communication scheduled. The UE can process the DCI and determine, based on no PDSCH communication being scheduled by the DCI, that the UE can transmit an uplink communication in the FFP. For a UE operating in idle mode, the uplink communication can be a physical random access channel (P-RACH) communication (e.g., a random access preamble (Msg1), a connection request (Msg3), a MsgA, etc.) and/or another type of uplink communication. For a UE operating in connected mode, the uplink communication can be a physical uplink control channel (PUCCH) communication, a physical uplink shared channel (PUSCH) communication, a sounding reference signal (SRS), and/or another type of uplink communication. In some instances, the DCI uses an existing DCI format (e.g., 0_1, 0_2, 1_2, etc.), which can avoid the need for additional configuration(s) and/or signaling for implementation. In some instances, the DCI indicates a PDSCH communication is not scheduled for the user equipment using one or more fields in the DCI. For example, a frequency domain resource allocation (FDRA) field can indicate that a PDSCH communication is not scheduled (e.g., all zeros for RA Type 0, all ones for RA Type 1, etc.).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT)

and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowl-edgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2:
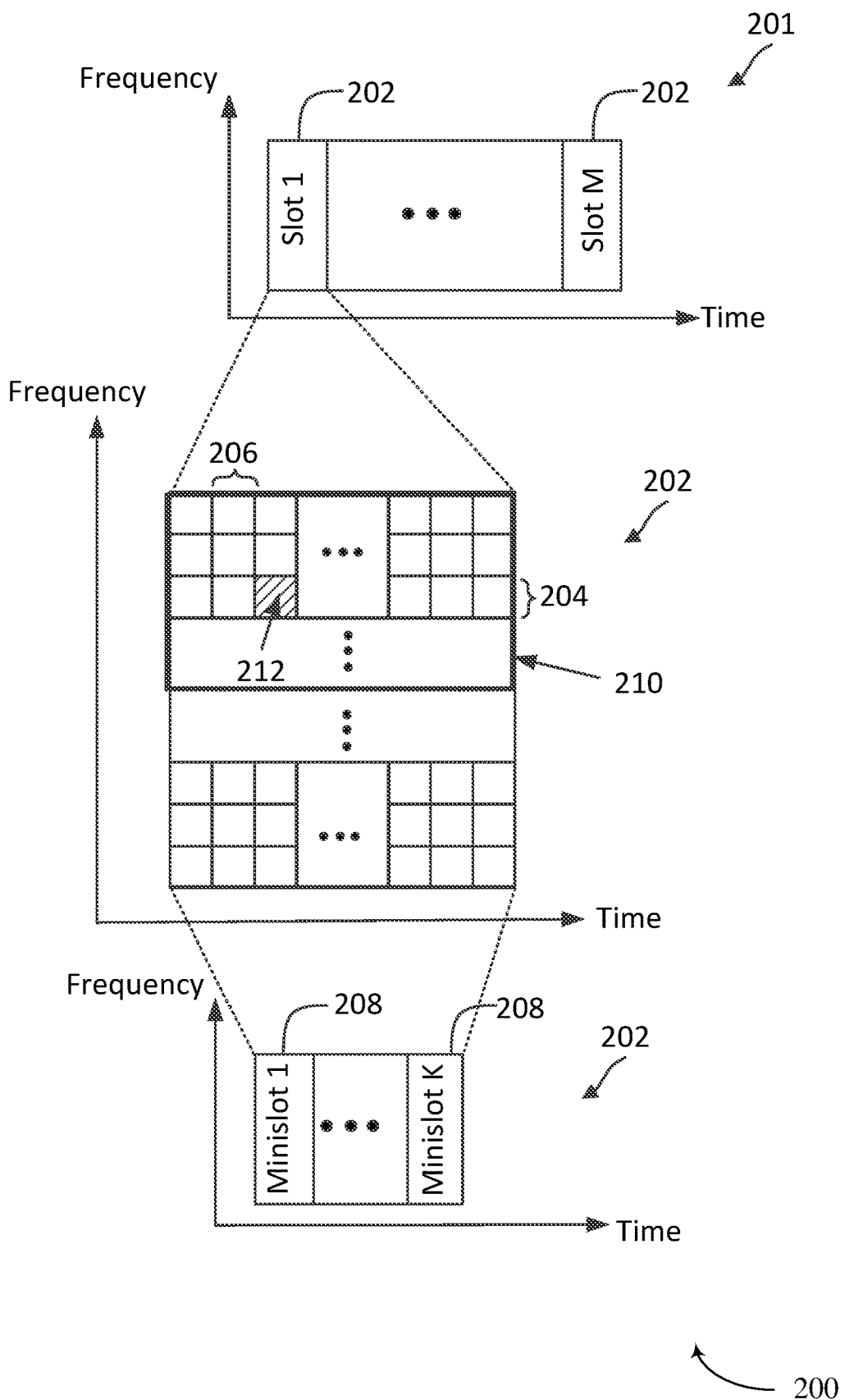
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3A:
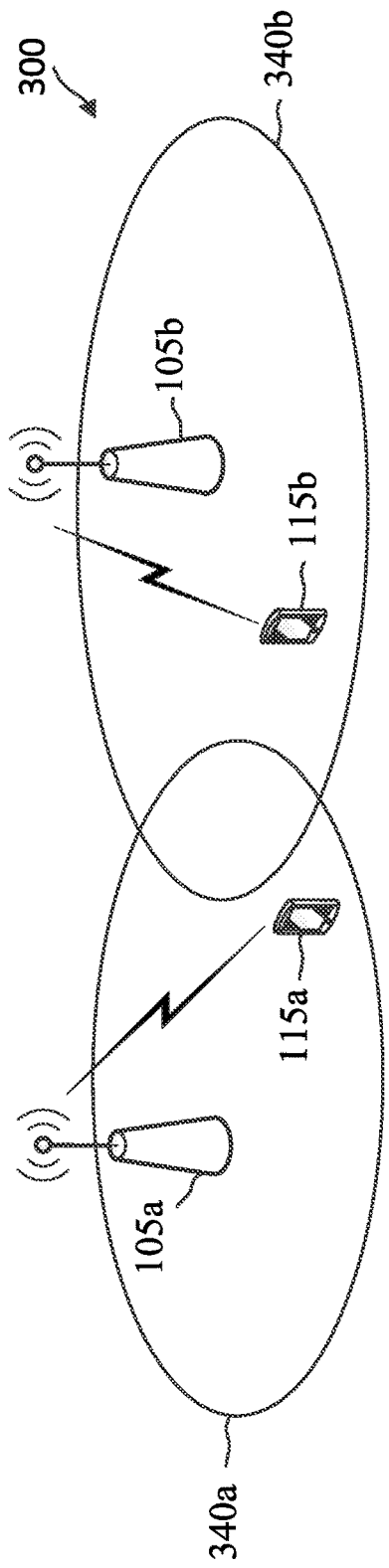
FIG. 3A illustrates an example of a wireless communications network that supports medium sharing across multiple network operating entities according to some aspects of the present disclosure.
Figure 3B:
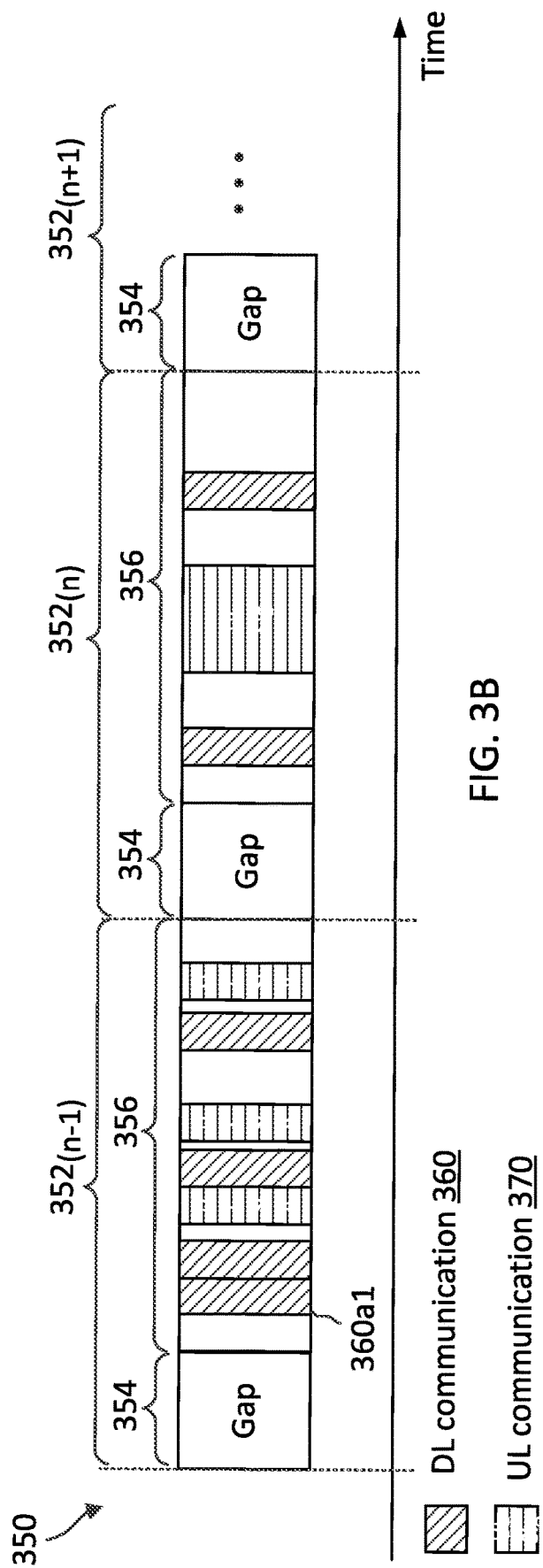
FIG. 3B illustrates a frame based equipment (FBE) communication scheme according to some aspects of the present disclosure.

FIGS. 3A and 3B collectively illustrate FBE-based communications over a radio frequency channel (e.g., in a shared radio frequency band or an unlicensed band) for communication. FIG. 3A illustrates an example of a wireless communications network 300 that supports medium sharing across multiple network operating entities according to some aspects of the present disclosure. The network 300 may correspond to a portion of the network 100. FIG. 3A illustrates two BSs 105 (shown as BS 105a and BS 105b) and two UEs 115 (shown as UE 115a and UE 115b) for purposes of simplicity of discussion, though it will be recognized that aspects of the present disclosure may scale to many more UEs 115 and/or BSs 105. The BSs 105 and the UEs 115 may be similar to the BSs 105 and the UEs 115 of FIG. 1. FIG. 3B illustrates an FBE communication scheme 350 according to some aspects of the present disclosure. The BS 105 and the UE 115 may communicate with each other as shown in the scheme 350. In FIG. 3B, the x-axis represents time in some arbitrary units, and the y-axis represents frequency in some arbitrary units.

Referring to FIG. 3A, in the network 300, the BS 105a serves the UE 115a in a serving cell or a coverage area 340a, while the BS 105b serves the UE 115b in a serving cell or a coverage area 340b. The BS 105a and the BS 105b may communicate with the UE 115a and the UE 115b in the same frequency channel (e.g., the frequency band 302 of FIG. 3B), respectively. In some instances, the BS 105a and the BS 105b may be operated by different network operating entities. In some other instances, the BS 105a and the BS 105b may be operated by different network operating entities. In some instances, the BS 105a and the BS 105b may utilize the same RAT (e.g., NR-based technology or WiFi-based technology) for communications with the UE 115a and the UE 115b, respectively. In some other instances, the BS 105a and the BS 105b use different RATs for communications with the UE 115a and the UE 115b, respectively. For example, the BS 105a and the UE 115a may utilize an NR-based technology for communication, while the BS 105b and the UE 115b may utilize WiFi-based technology communication. In general, the BS 105a and the BS 105b may be operated by the same network operating entities or different network operating entities and may utilize the same RAT or different RATs for communications in the network 300. The BS 105a, the BS 105b, the UE 115a, and the UE 115b may share access to the channel using an FBE-based contention mode as shown in the FBE communication scheme 350.

Referring to FIG. 3B, the scheme 350 partitions the frequency band 302 into a plurality of frame periods 352 (shown as $352_{(n-1)}$, $352_{(n)}$, and $352_{(n+1)}$). Each frame period 352 includes a contention or gap period 354 and a transmission period 356. The frame period 352 may have a resource structure as shown in the radio frame structure 200. In some instances, each frame period 352 may include one or more slots similar to the slots 202. In some instances, each frame period 352 may include one or more symbols similar to the symbols 206. The starting time and the duration of the frame periods 352 and the gap periods 354 are predetermined. Additionally, each frame period 352 may have the same duration. Similarly, each gap period 354 may have the same duration. Thus, the frame periods 352 may also be referred to as fixed frame periods (FFPs). In some other instances, the frame periods 352 may be referred to as COTs. In some aspects, a gap period 354 may have a minimum duration of 5 percent (%) of the total time frame period 352 according to some regulations.

A node (e.g., the BS 105a or the BS 105b) interested in using a frame period 352 for communication may contend for the channel during the corresponding gap period 354, for example, by performing an LBT to determine whether another node may have reserved the same frame period 352. If the LBT is successful, the node may transmit an indication of a reservation for the frame period 352 so that other nodes may refrain from using the same frame period 352. The LBT can be based on energy detection or signal detection. The reservation indication can be a predetermine sequence or waveform or any suitable signal. If the LBT is unsuccessful, the node may back off until the start of a next gap period 354, where the node may attempt another contention during the gap period 354.

Figure 4:
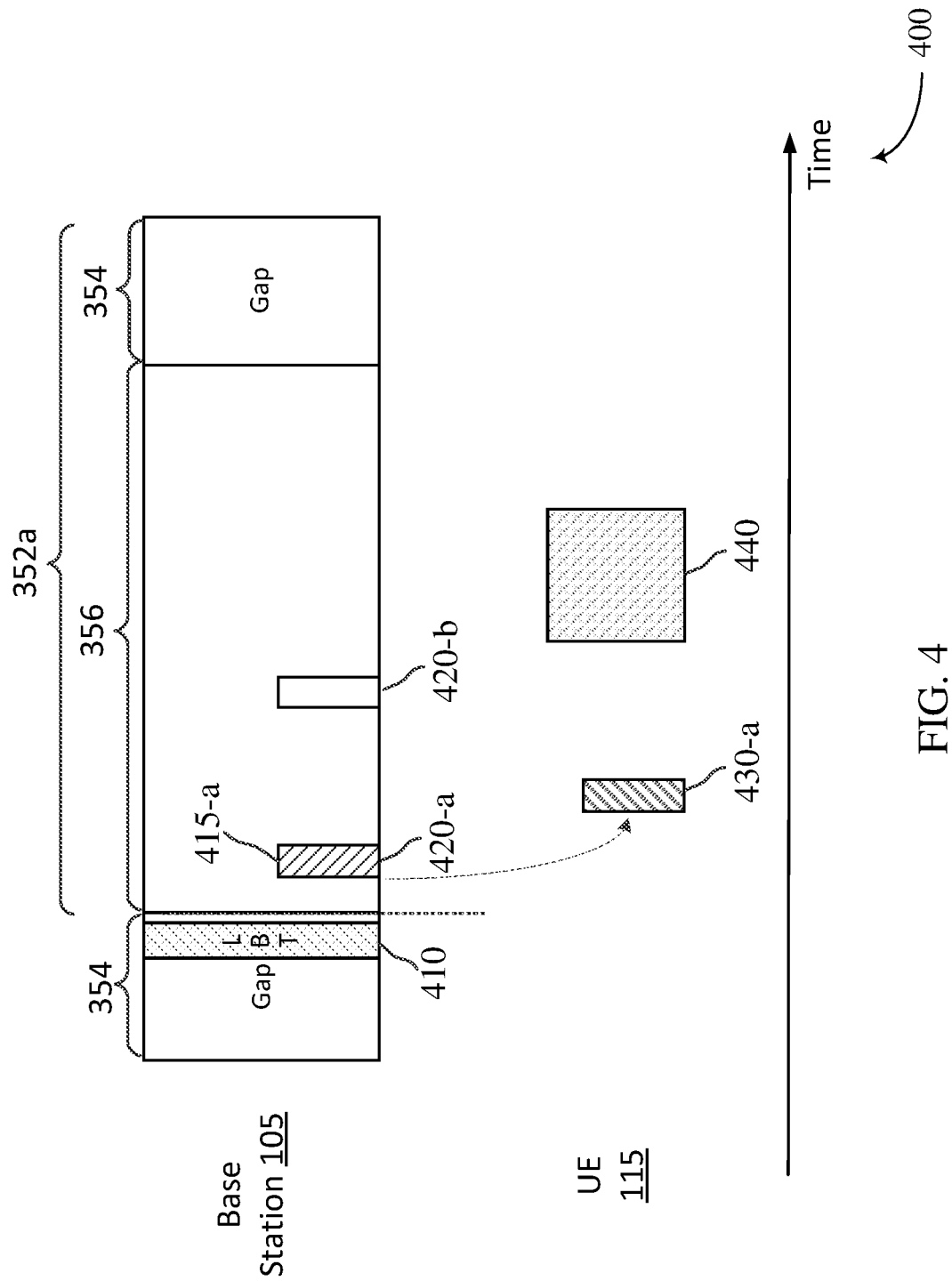
FIG. 4 illustrates an FBE communication scheduling/transmission configuration according to some aspects of the present disclosure.

While FIG. 3B illustrates a gap period 354 located at the beginning of a frame period 352, in some instances, the gap period 354 can be located at the end of a frame period 352, where the gap period may be used for contention for a next frame period (see, e.g., FIG. 4).

In some aspects, each frame period 352 may have the same duration. In some aspects, the duration of a frame period 352 may be a factor of a reference duration. The reference duration may be twice the duration of a radio frame. For instance, for a 10 ms radio frame, a frame period 352 may have a duration of about 1 ms, 2 ms, 2.5 ms, 4 ms, 5 ms, 10 ms, or 20 ms. In an example, a frame period field may have a length of about 3 bits, where a value of 0 may indicate a duration of 1 ms, a value of 1 may indicate a duration of 2 ms, a value of 2 may indicate a duration of 2.5 ms, a value of 3 may indicate a duration of 4 ms, a value of 4 may indicate a duration of 5 ms, a value of 5 may indicate a duration of 10 ms, and a value of 6 may indicate a duration of 20 ms. When a radio frame has a duration of 10 ms, each radio frame may be aligned to the start of a frame period 352 for a frame period 352 duration of 1 ms, 2 ms, 2.5 ms, 4 ms, 5 ms, or 10 ms. For a frame period 352 duration of 20 ms, every other radio frame may align to the start of a frame period 352. In some other instances, the reference duration may be about 40 ms, 50 ms, 60 ms, 80 ms, 100 ms, or any suitable integer multiples of a radio frame duration.

In some aspects, the duration of a gap period 354 can be in units of symbols (e.g., the symbols 206). As discussed above, the gap period 354 may be configured to satisfy a certain regulation with a minimum of 5% of a total frame period. Thus, the gap period 354 may include a minimum integer number of symbols that is greater than a minimum portion (e.g., 5%) of the frame period 352. For example, the duration of the gap period 354 can be computed as shown below:

$$N_{Symbols} = \text{round}\left(\frac{0.05 \times T_{frame\ period}}{T_{Symbol}}\right), \quad (1)$$

where $N_{symbols}$ represents the number of symbols in the gap period 354, $T_{frame\ period}$ represents the duration of a frame period 352, and $T_{symbol}$ represents the duration of a symbol. In some aspects, the minimum gap duration or the factor 5% may be configurable by the network. For instance, the factor may be 4%, 6%, or 7% or more. As an example, for a frame period 352 with a duration of about 4 ms and an SCS of about 30 kHz, the gap period 354 may include about 6 symbols. In some other instances, the gap period 354 may occupy a minimum percentage of the frame period 352 as specified by a wireless communication protocol. In some instances, the number of symbols in a gap period 354 may vary depending on the time location of the gap period 354 within a radio frame 606. For instance, in a certain configuration, the symbol time may be longer at every 0.5 ms.

In some aspects, the duration of a gap period 354 can be in units of slots (e.g., the slots 202). For example, the duration of the gap period 354 can be computed as shown below:

$$N_{Slots} = \text{round}\left(\frac{0.05 \times T_{frame\ period}}{T_{Slot}}\right), \quad (2)$$

where $N_{slots}$ represents the number of slots in the gap period 354, $T_{frame\ period}$ represents the duration of a frame period 352, and $T_{Slot}$ represents the duration of a slot.

In some aspects, a duration of the gap period 354 can be determined based on the duration of the frame period 352. As discussed, the gap period 354 may have a duration that is at least a certain factor (e.g., about 5%) of the duration of the frame period 352. Accordingly, the UE 115 may compute the duration of the gap period 354 using the equation (1) or (2) discussed above.

In the illustrated example of FIG. 3B, the BS 105a and the BS 105b may contend for the frame periods $352_{(n-1)}$, $352_{(n)}$, and $352_{(n+1)}$ during corresponding gap periods 354. The BS 105a may win the contention for the frame period $352_{(n-1)}$ and $352_{(n+1)}$, while the BS 105b may win the contention for the frame period $352_{(n)}$. After winning a contention, the BS 105a or the BS 105b may schedule DL communication(s) 360 and/or UL communication(s) 370 with the UE 115a or the UE 115b, respectively, within the corresponding non-gap duration or transmission period 356. The DL communication 360 may include DL control information (e.g., PDCCH control information) and/or DL data (e.g., PDSCH data). The UL communication 370 may include UL control information (e.g., PUCCH control information), PRACH signals, random access messages, periodic-sounding reference signals (p-SRSs), and/or UL data (e.g., PUSCH data). For instance, the BS 105a may transmit a DL scheduling grant (e.g., PDCCH scheduling DCI) or a UL scheduling grant (e.g., PDCCH scheduling DCI) for a DL communication 360 or an UL communication 370 with the UE 115a during the frame period $352_{(n-1)}$. The UE 115a may monitor for scheduling grants from the BS 105a and transmit UL communication 370 to the BS 105a or receive DL communication 360 from the BS 105a according to the grants. In some aspects, the UE 115a may perform a category 3 (CAT2) LBT prior to transmitting the UL communication 370. A CAT2 LBT may refer to a one-shot LBT with no random backoff.

In some aspects, the BS 105a may transmit a PDCCH signal (shown as 360a1) at or near the beginning of the transmission period 356 to signal to the UE 115a that the BS 105a has won the contention for the frame period $352_{(n-1)}$. In some instances, the PDCCH signal may include downlink control information (DCI). In some instances, the DCI includes a group common-PDCCH (GC-PDCCH) DCI signaling to a group of UEs served by the BS 105a that the BS 105a has won the contention for the frame period $352_{(n-1)}$ so the UEs may monitor for PDCCH from the BS 105a. In some instances, the GC-PDCCH may include a slot format indication (SFI) indicating transmission directions assigned to symbols within the transmission period 356 of the frame period $352_{(n-1)}$. The indication of the BS 350a winning access to the frame period $352_{(n-1)}$ may generally be referred to as a COT indication.

In some aspects, the BS 105a may configure the UE 115a with configured grants or configured resources for configured UL transmissions. The configured grants or resources may be periodic. When a configured resource or grant is within the transmission period 356 of the frame period $352_{(n-1)}$, the UE 115a may monitor for a COT indication from the BS 105a during the frame period $352_{(n-1)}$. Upon detecting a COT indication from the BS 105a, the UE 115a may transmit using the configured grant resource in the frame period $352_{(n-1)}$.

In some aspects of the present disclosure, the UE 115a may determine based on the DCI 360a1 that the UE 115a can transmit an uplink communication to the BS 105a during the frame period $352_{(n-1)}$. In some instances, the BS 105a transmits the DCI 360a1 with content indicating that there is no associated physical downlink shared channel (PDSCH) communication scheduled. The UE 115a can process the DCI and determine, based on no PDSCH communication being scheduled by the DCI 360a1, that the UE 105a can transmit an uplink communication in the FFP. If the UE 115a is operating in idle mode, then the uplink communication(s) 370 can include a physical random access channel (P-RACH) communication (e.g., a random access preamble (Msg1), a connection request (Msg3), a MsgA, etc.) and/or another type of uplink communication. If the UE 115a is operating in connected mode, the uplink communication(s) 370 can include a physical uplink control channel (PUCCH) communication, a physical uplink shared channel (PUSCH) communication, a sounding reference signal (SRS), and/or another type of uplink communication. In some instances, the DCI 360a1 uses an existing DCI format (e.g., 0_1, 0_2, 1_2, etc.). In some instances, the DCI 360a1 indicates a PDSCH communication is not scheduled for the UE 115a using one or more fields in the DCI 360a1. For example, a frequency domain resource allocation (FDRA) field of the DCI 360a1 can indicate that a PDSCH communication is not scheduled (e.g., all zeros for RA Type 0, all ones for RA Type 1, etc.).

Once the BS 105a or the BS 105b won the contention for a frame period 352, the frame period 352 is used exclusively by the BS 105a or the BS 105b that won the contention. Thus, the BS 105a or the BS 105b can leave an idle period (shown as blank boxes) with no transmission in the frame period 352. When operating in the FBE mode, another node may not occupy the channel during the idle period since contention may only occur during the gap periods 354.

As discussed above, when operating in an FBE communication mode, the frame periods 352 and the gap periods 354 are predetermined are known prior to communications in the FBE mode. Accordingly, the present disclosure provides techniques to signal FBE structures for FBE communication over a shared radio frequency band. The present disclosure also provides techniques to enable UEs (e.g., the UEs 115 and/or 800) to access a network (e.g., the networks 100 and/or 300) when the network operates in an FBE mode.

FIG. 4 illustrates an FBE communication scheduling/transmission configuration 400 according to some aspects of the present disclosure. As shown, the BS 105 performs an LBT 410 to contend for the frame period 352a. In the illustrated example, the BS 105 wins the contention for the frame period 352a and, therefore, can occupy the frame period 352a. During the transmission period 356 of the frame period 352a the BS transmits downlink control information (DCI) 415-a in a search space of the shared radio frequency band. In some instances, at block 1110 the BS transmits the DCI 415-a masked with a system information radio network temporary identifier (SI-RNTI) (e.g., for an idle mode UE) or masked with a cell radio network temporary identifier (C-RNTI) (e.g., for a connected mode UE). In some instances, the BS transmits the DCI 415-a in DCI format 1_0 masked with SI-RNTI. In some instances, the BS transmits the DCI in DCI format 1_2 masked with C-RNTI or in DCI format 0_2 masked with the C-RNTI.

Figure 5:
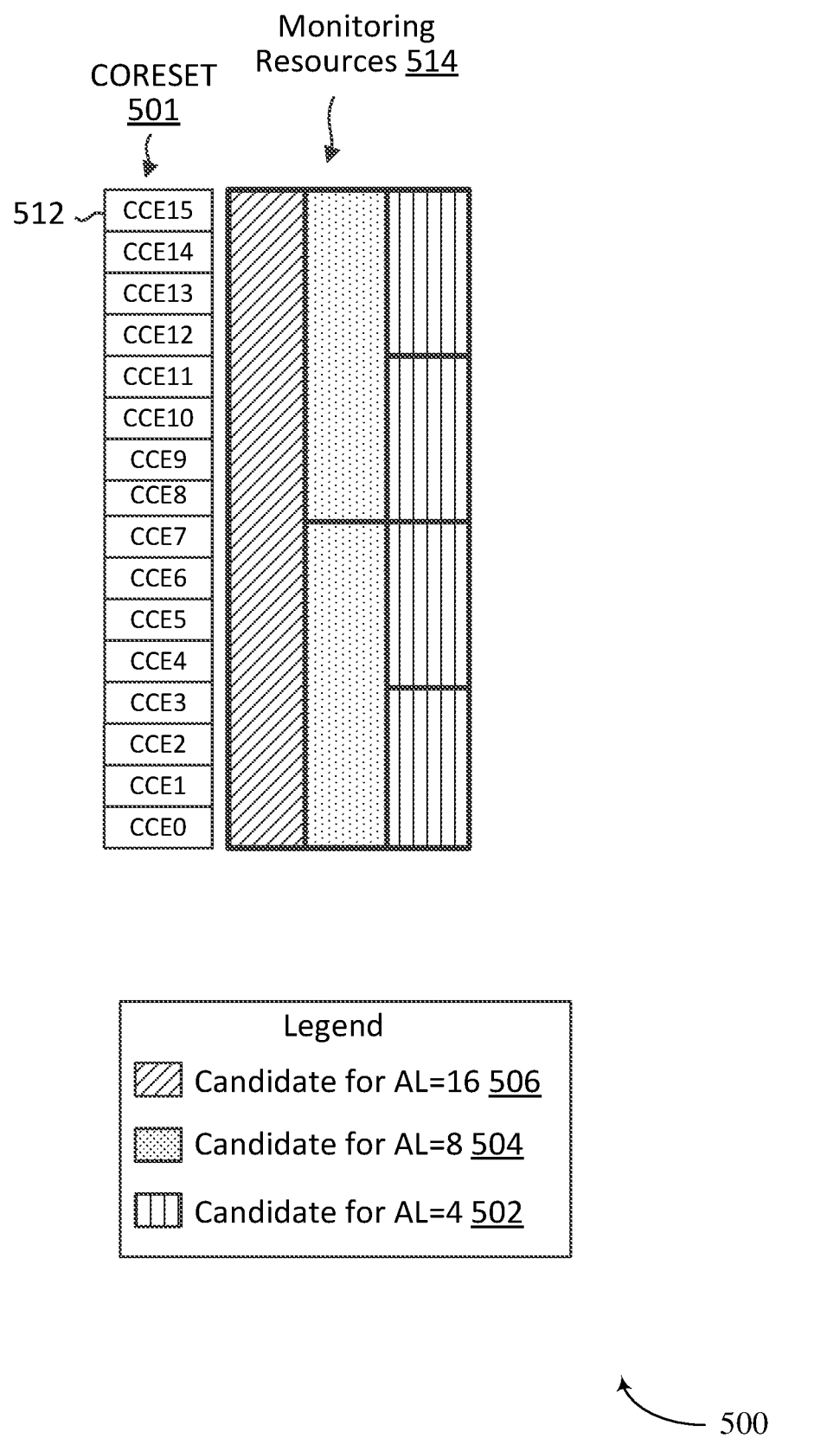
FIG. 5 illustrates a search space/CORESET configuration scheme according to some aspects of the present disclosure.

In some instances, the BS transmits the DCI 415-a based on one or more predefined resource candidates 420. The BS may decide to transmit the DCI 415-a using one or more, including all, of the resource candidates. For example, in FIG. 4, two candidate resource locations 420-a and 420-b are illustrated as being available for transmitting the DCI, but only resource 420-a is used by the BS 105 for transmitting the DCI 415-a. The resource candidates may be based on a CORESET, search space (common, group-specific, and/or UE-specific), time resources, frequency resources, aggregation level, and/or combinations thereof. In some instances, aspects of the search space/CORESET configuration scheme 500 discussed below with respect to FIG. 5 are utilized. The predefined resource candidates may be set by a network specification, programmed in the BS's memory, and/or combinations thereof. The predefined resource candidates may be determined by the BS and communicated to one or more UEs through an RRC-configuration, a SIB, a MIB, and/or other signaling. In some instances, the BS transmits the DCI 415-a in a common search space (CSS) of a physical downlink control channel (PDCCH). In some instances, the common search space is a Type 0 CSS. In some instances, the BS transmits the DCI 415-a in a user-equipment specific search space (USS) of a PDCCH.

The UE 115 monitors the search space of the shared radio frequency band for downlink communications from the BS operating in the FBE mode. In some instances, the UE 115 operates in an idle mode while monitoring for the downlink communication. In some instances, the UE 115 operates in an RRC connected mode while monitoring for the downlink communication. The UE 115 can monitor for the downlink communications based on one or more predefined resource candidates, such as the resource candidates discussed above. For example, the UE 115 can monitor for the downlink communication in a CSS and/or a USS of a PDCCH.

Based on the monitoring, the UE 115 can receive the DCI 415-a as indicated by communication 430-a. The UE 115 may receive the DCI 415-a masked with SI-RNTI (e.g., for an idle mode UE) or masked with C-RNTI (e.g., for a connected mode UE). In some instances, the UE 115 receives the DCI 415-a in DCI format 1_0 masked with SI-RNTI. In some instances, the UE 115 receives the DCI 415-a in DCI format 1_2 masked with C-RNTI or in DCI format 0_2 masked with the C-RNTI.

In some instances, the DCI 415-a does not schedule a PDSCH communication for the UE 115. In some instances, the BS 105 indicates that a PDSCH communication is not scheduled for the UE 115 using on one or more fields in the DCI 415-a. For example, the value of one or more fields of the DCI 415-a may indicate that a PDSCH communication is not scheduled for a UE 115. In some instances, the one or more fields includes a frequency domain resource allocation (FDRA) field. In this regard, the values of the FDRA field can indicate that the PDSCH communication is not scheduled for the UE 115 (e.g., all zeros for RA Type 0, all ones for RA Type 1, etc.). In some instances, a combination of values across multiple fields of the DCI 415-a can indicate that the PDSCH communication is not scheduled for the UE 115. In this regard, the values of the multiple fields can correspond to a set of values that indicate to the UE 115 that a PDSCH communication is not scheduled for the UE 115.

The UE 115 can determine, based on the DCI 415-a received at 430-a, that the DCI 415-a does not schedule a PDSCH communication for the UE 115. In some instances, the UE 115 determines the DCI does not schedule the PDSCH communication for the UE 115 based on one or more fields in the DCI as discussed above. In some instances, the UE 115 uses the determination that the DCI 415-a does not schedule a PDSCH communication for the UE 115 to determine that the UE 115 can transmit an uplink communication 440 to the BS in the frame period 352a. In some instances, the uplink communication 440 is a physical random access channel (P-RACH) communication (e.g., a random access preamble (Msg1), a connection request (Msg3), a MsgA, etc.). In some instances, the uplink communication 440 is a physical uplink control channel (PUCCH) communication, a physical uplink shared channel (PUSCH) communication, a sounding reference signal (SRS), and/or another type of uplink communication. In this manner, the transmission of the DCI 415-a that does not schedule a PDSCH communication can be utilized to validate uplink communication(s) by the UE 115 to the BS 105.

FIG. 5 illustrates a search space/CORESET configuration scheme 500 according to some aspects of the present disclosure. The scheme 500 may be employed by BSs such as the BSs 105 and UEs such as the UEs 115 in a network such as the network 100 for communications. For example, the search spaces, aggregation levels, and/or resource allocations associated with the search space/CORESET configuration scheme 500 may be used by the BSs 105 and UEs 115 in communicating the DCIs (e.g., DCIs 420a, 630, 730) in accordance with the present disclosure. In particular, the BS 105 may communicate PDCCH with UEs 115 using time-frequency resources configured as shown in the scheme 500. FIG. 5 illustrates an example of a CORESET 501 including sixteen CCEs 512 in a 20 MHz channel. The CCEs 512 may be indexed from 0 to 15 (shown as CCE1 to CCE15). Each CCE 512 can include six resource element groups (REGs), where a REG can be defined as one physical RB in one symbol. In some aspects, the CORESET 501 may span 96 RBs (e.g., RBs 210) with an SCS of 15 kHz in frequency and one symbol (e.g., the symbols 206) in time. In other words, each CCE 512 may span 6 RBs in frequency and one symbol in time. In some other aspects, the CORESET 501 may span 48 RBs with an SCS of 30 kHz in frequency and two symbols in time. In other words, each CCE 512 may span 3 RBs in frequency and 2 symbols in time.

A BS (e.g., the BSs 105) may transmit a SIB schedule in a PDCCH search space associated with the CORESET 501 using an aggregation of four CCEs 512, an aggregation of eight CCEs 512, or an aggregation of sixteen CCEs 512. The PDCCH search space can be an instance of the CORESET in a certain slot. An aggregation of four CCEs 512 may be referred to as an aggregation level (AL) of 4. An aggregation of eight CCEs 512 may be referred to as an AL of 8. An aggregation of sixteen CCEs 512 may be referred to as an AL of 16. The higher the AL, the more redundancy and more frequency diversity can be provided by the PDCCH transmission, and thus the more robust the PDCCH transmission may be. A UE (e.g., the UEs 115) may monitor for SIB scheduling information by performing blind decoding to search for a PDCCH candidate in the CORESET 501 based on an aggregation level (AL) of 4, 8, or 16. The PDCCH monitoring for SIB scheduling is a PDCCH type-0 monitoring. In some aspects, as part of the PDCCH blind decoding, a UE may decode one PDCCH candidate for an AL of 16, two PDCCH candidates for an AL of 8, and four PDCCH candidates for an AL of 4 in the PDCCH search space. In some aspects, the PDCCH candidates in a CORESET 501 are mapped to the CCEs 512 as shown below:

$$L \times \left\{ \left\lfloor \frac{m \times N_{CCE}}{L \times M_{max}^{(L)}} \right\rfloor \mod \left\lfloor \frac{N_{CCE}}{L} \right\rfloor \right\} + i, \quad (1)$$

where $N_{CCE}$ represents the number of CCEs 512 in the CORESET 501, L represents the AL, i may vary from 0 to L−1, and $M_{max}^{(L)}$ represents the maximum number of PDCCH candidates for a certain AL.

Figure 6:
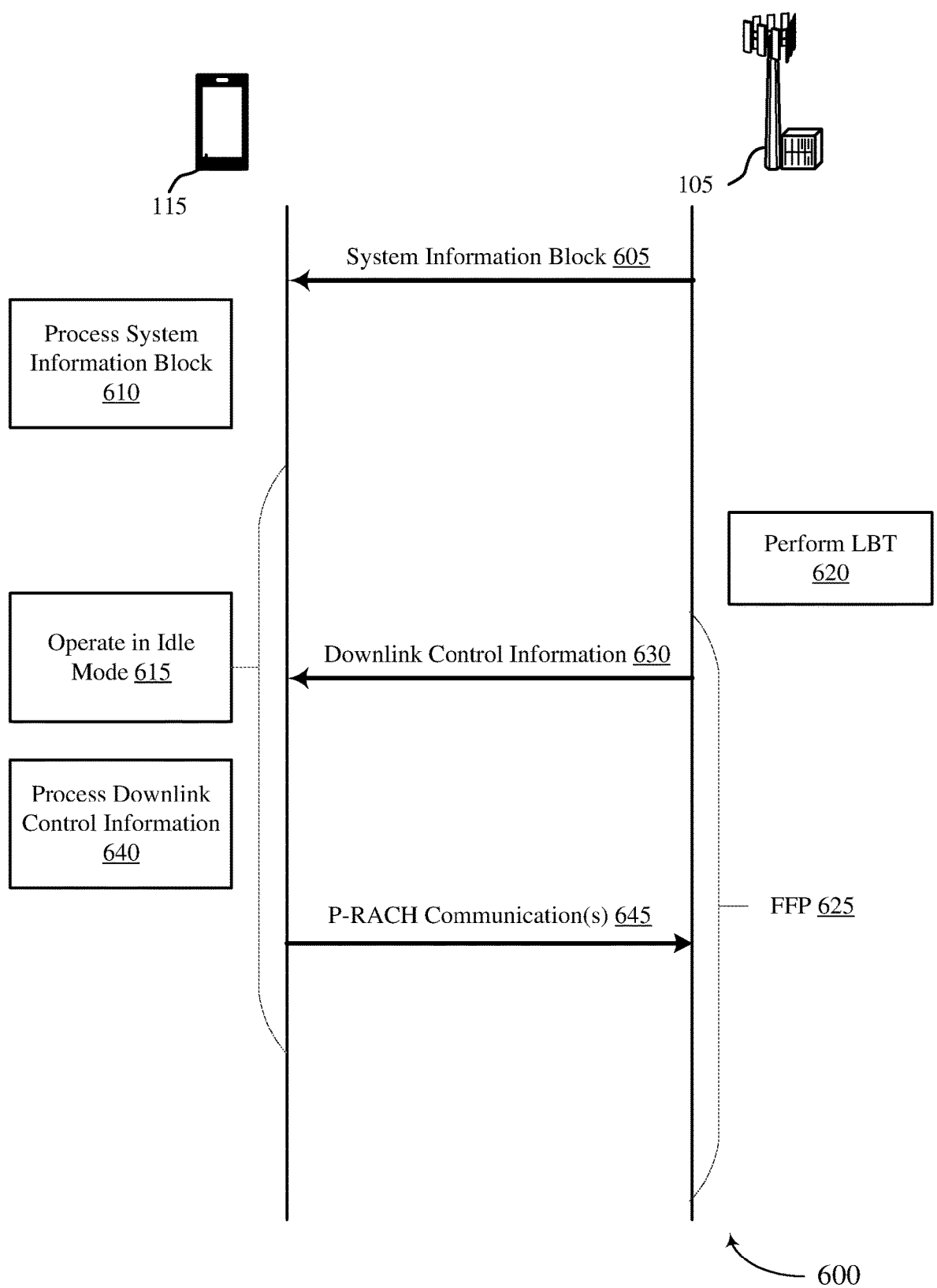
FIG. 6 illustrates a signaling diagram of an FBE communication method according to some aspects of the present disclosure.

FIG. 6 illustrates a signaling diagram of an FBE communication method 600 according to some aspects of the present disclosure. At 605, the BS 105 transmits a system information block (e.g., a SIB-1). In some instances, the system information block indicates the BS and/or a shared radio frequency band is operating in a FBE mode. The UE 115 can receive the system information block. At 610, the UE 115 can process the system information block to determine that the BS and/or the shared frequency spectrum is operating in a FBE mode. At 615, the UE operates in an idle mode. While operating in idle mode, the UE 115 may only be able to detect downlink signals (e.g., SSB or PDCCH) masked with SI-RNTI.

At 620, the BS 105 performs an LBT to contend for the fixed frame period 625. In the illustrated example, the BS 105 wins the contention for the fixed frame period 625 and, therefore, can occupy the frame period 625. At 630, during a transmission period of the fixed frame period 625, the BS 105 transmits downlink control information (DCI) in a search space of the shared radio frequency band. In some instances, the BS 105 transmits the DCI masked with SI-RNTI such that it can be received by the UE 115 operating in idle mode. For example, in some instances, at 630, the BS transmits the DCI in DCI format 1_0 masked with SI-RNTI. In some instances, the BS 105 transmits the DCI, at 630, based on one or more predefined resource candidates as discussed above. The BS 105 may transmit the DCI using one or more, including all, of the available resource candidates for the DCI in the fixed frame period 625. In some instances, the BS transmits the DCI, at 630, in a common search space (CSS) of a physical downlink control channel (PDCCH). In some instances, the common search space is a Type 0 CSS.

While operating in idle mode, the UE 115 can monitor the search space of the shared radio frequency band for downlink communications from the BS 105. The UE 115 can monitor for the downlink communications based on one or more predefined resource candidates, such as the resource candidates discussed above. For example, the UE 115 can monitor for the downlink communication in a CSS of a PDCCH, including a Type 0 CSS.

Based on the monitoring, the UE 115 can receive the DCI and process the DCI at 640. In some instances, the UE determines, based on the processing at 640, that the DCI does not schedule a PDSCH communication for the UE 115. In some instances, the UE 115 determines the DCI does not schedule the PDSCH communication for the UE 115 based on one or more fields in the DCI as discussed above. In some instances, the UE 115 uses the determination that the DCI does not schedule a PDSCH communication for the UE 115 to determine that the UE 115 can transmit, at 645, an uplink communication to the BS in the frame period 625. In some instances, the uplink communication is, as shown in FIG. 6, a physical random access channel (P-RACH) communication (e.g., a random access preamble (Msg1), a connection request (Msg3), a MsgA, etc.). In this manner, the BS 105 can transmit the DCI, at 630, to indicate to the UE 115 that one or more RACH opportunities are available to the UE 115 during the fixed frame period 625 in order to establish an RRC connection with the BS. Accordingly, in some instances when a UE is not provided with a C-RNTI and is configured with ChannelAccessMode-r16=semistatic (e.g., FBE mode), the UE assumes that an FFP is acquired by BS if the UE detects a PDCCH with the FDRA field in the DCI as all ones for type 1 PDSCH allocation scrambled with SI-RNTI in PDCCH candidate of TYPE0 CSS in the FFP containing at least one valid RACH occasion (RO).

Figure 7:
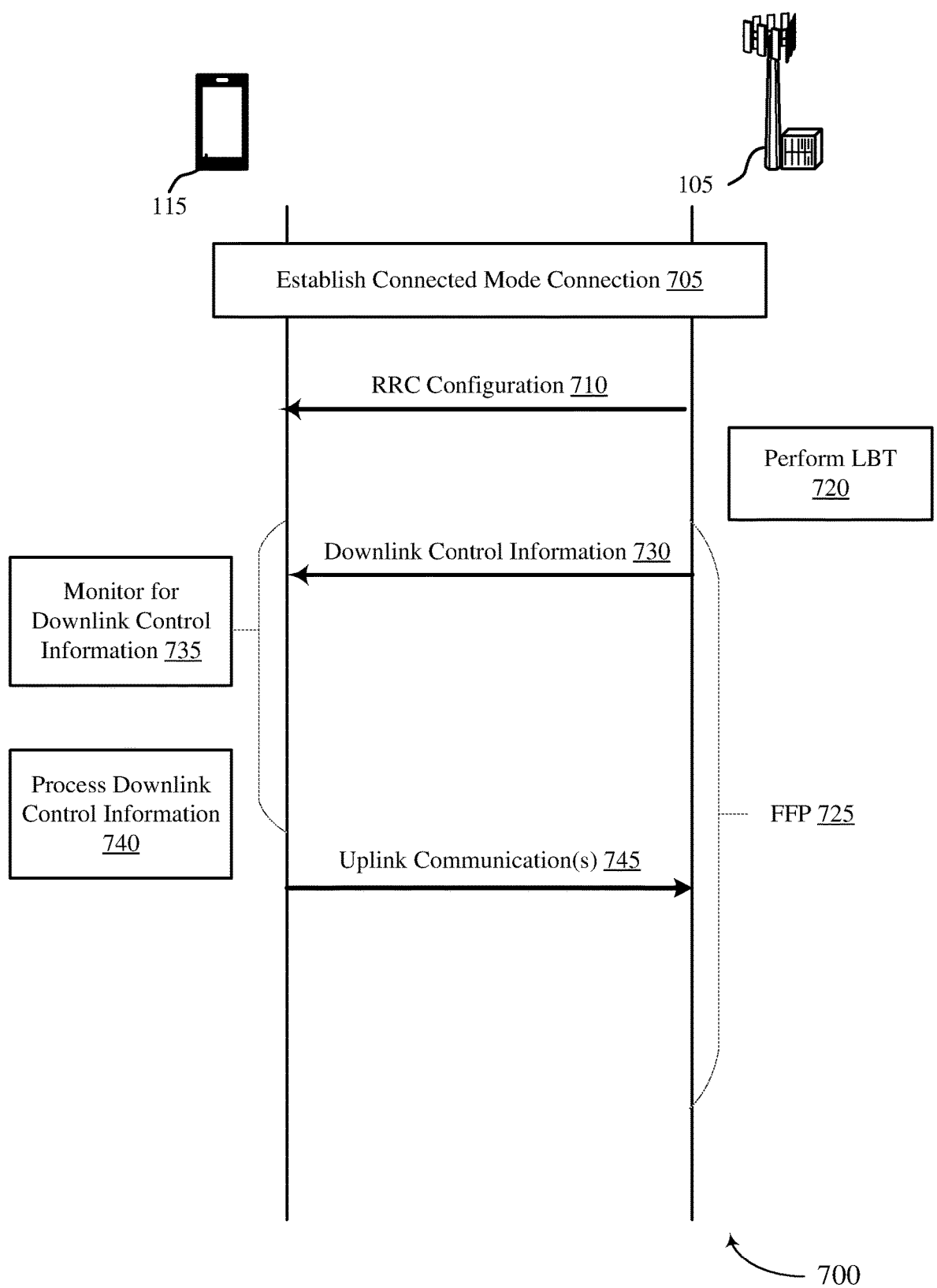
FIG. 7 illustrates a signaling diagram of an FBE communication method according to some aspects of the present disclosure.

FIG. 7 illustrates a signaling diagram of an FBE communication method according to some aspects of the present disclosure. At 705, the BS 105 and the UE 115 establish a connected mode connection, such as an RRC connection. At 710, the BS 105 transmits an RRC configuration. In some instances, the RRC configuration indicates one or more predefined resource candidates for the UE 115 to monitor for downlink communications from the BS 105. In some instances, the BS 105 defines the resource candidates based on a CORESET, search space (common, group-specific, and/or UE-specific), time resources, frequency resources, aggregation level, and/or combinations thereof. In some instances, the BS 105 indicates to the UE 115 a user-equipment specific search space (USS) of a PDCCH to monitor.

At 720, the BS 105 performs an LBT to contend for the fixed frame period 725. In the illustrated example, the BS 105 wins the contention for the fixed frame period 725 and, therefore, can occupy the frame period 725. At 730, during a transmission period of the fixed frame period 725, the BS 105 transmits downlink control information (DCI) in a search space of the shared radio frequency band. In some instances, the BS 105 transmits the DCI masked with C-RNTI such that it can be received by the UE 115 operating in the connected mode. For example, in some instances, at 730, the BS transmits the DCI in DCI format 1_2 masked with C-RNTI or in DCI format 0_2 masked with the C-RNTI. In some instances, the BS 105 transmits the DCI, at 730, based on one or more predefined resource candidates as discussed above. In some instances, the BS transmits the DCI, at 630, in a USS of a PDCCH.

While operating in connected mode, at 735, the UE 115 can monitor the search space of the shared radio frequency band for downlink communications from the BS 105. The UE 115 can monitor for the downlink communications based on one or more predefined resource candidates, such as the resource candidates discussed above. For example, the UE 115 can monitor for the downlink communication in a USS of a PDCCH. As noted above, the UE 115 may receive an indication of the resources to monitor via an RRC-configuration. In some instances, the resource candidates are not indicated to the UE via an RRC-configuration.

Based on the monitoring at 735, the UE 115 can receive the DCI and process the DCI at 740. In some instances, the UE determines, based on the processing at 740, that the DCI does not schedule a PDSCH communication for the UE 115. In some instances, the UE 115 determines the DCI does not schedule the PDSCH communication for the UE 115 based on one or more fields in the DCI as discussed above. In some instances, the UE 115 uses the determination that the DCI does not schedule a PDSCH communication for the UE 115 to determine that the UE 115 can transmit, at 745, uplink communication(s) to the BS in the frame period 725. In some instances, the uplink communication(s) include a PUCCH and/or PUSCH communication. In this manner, the BS 105 can transmit the DCI, at 730, to indicate to the UE 115 that one or more uplink opportunities are available to the UE 115 during the fixed frame period 725. In this manner, the BS 105 can provide a single UE 115 one or more uplink opportunities in the fixed frame period 725, in contrast to a GC-PDCCH indicating that the BS won the contention for fixed frame period 725.

Figure 8:
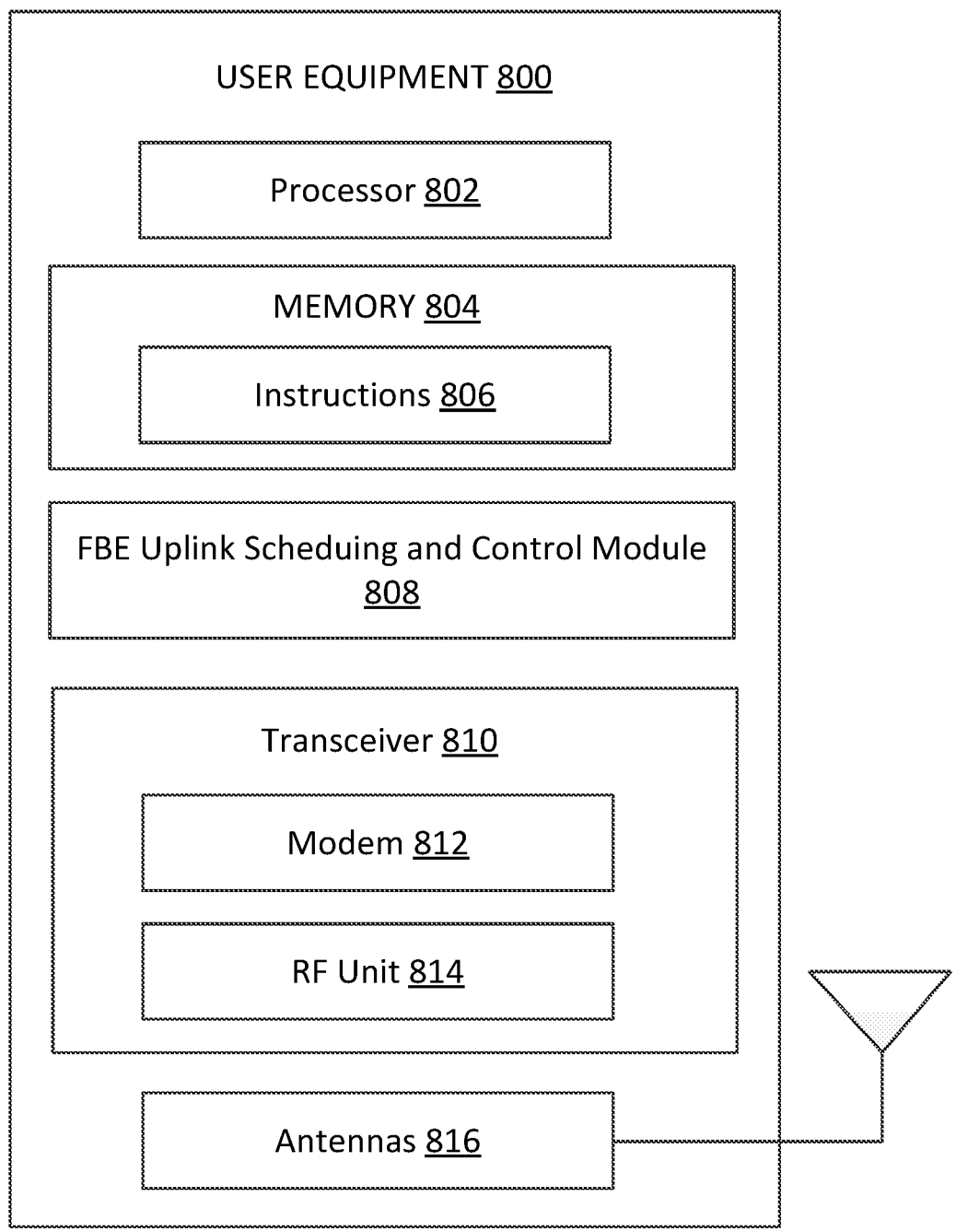
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIG. 1. As shown, the UE 800 may include a processor 802, a memory 804, an FBE uplink scheduling and control module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 2-7 and 10. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The FBE uplink scheduling and control module 808 may be implemented via hardware, software, or combinations thereof. For example, the FBE uplink scheduling and control module 808 may be implemented as a processor, circuit, and/or instructions 806 stored in the memory 804 and executed by the processor 802. In some instances, the FBE uplink scheduling and control module 808 can be integrated within the modem subsystem 812. For example, the FBE uplink scheduling and control module 808 can be implemented by a combination of software components (e.g., executed by a DSP or a general processor) and hardware components (e.g., logic gates and circuitry) within the modem subsystem 812.

The FBE uplink scheduling and control module 808 may be used for various aspects of the present disclosure, for example, aspects of aspects of FIGS. 2-7 and 10. The FBE uplink scheduling and control module 808 is configured to monitor, in a search space of a shared radio frequency band, for a downlink communication from a base station (e.g., the BSs 105 and/or 900) operating in a frame based equipment (FBE) mode, receive DCI from the BS, determine whether the DCI schedules a physical downlink shared channel (PDSCH) communication for the UE 800, transmit an uplink communication (e.g., PRACH, PUCCH, and/or PUSCH communication) to the base station based on determining the DCI does not schedule an PDSCH communication for the UE 800, and/or communicate UL communications (e.g., PUCCH and/or PUSCH) and/or DL communications (e.g., PDCCH and/or PDSCH) with the BS.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the FBE uplink scheduling and control module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH control information, PRACH signals, PUSCH data) from the modem subsystem 812 (on outbound transmissions) or of transmissions originating from another source such as another UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., DCI, SSBs, RMSI, MIB, SIB, FBE configuration, PRACH configuration PDCCH, PDSCH) to the FBE uplink scheduling and control module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
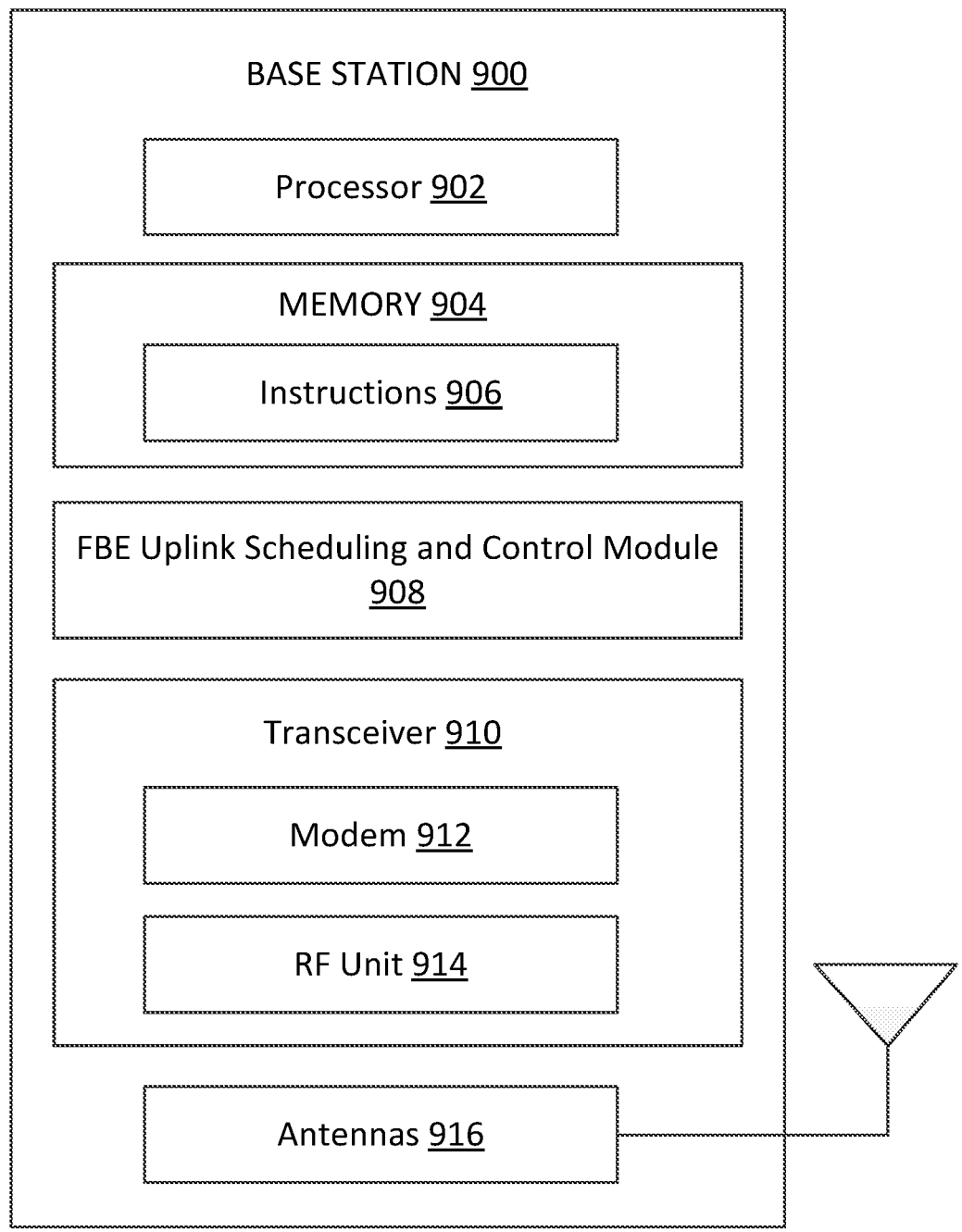
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIGS. 1 and 3A. A shown, the BS 900 may include a processor 902, a memory 904, an FBE uplink scheduling and control module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7 and 11. Instructions 906 may also be referred to as code, which may be interpreted broadly to include any type of computer-readable statement(s) as discussed above.

The FBE uplink scheduling and control module 908 may be implemented via hardware, software, or combinations thereof. For example, the FBE uplink scheduling and control module 908 may be implemented as a processor, circuit, and/or instructions 906 stored in the memory 904 and executed by the processor 902. In some instances, the FBE uplink scheduling and control module 908 can be integrated within the modem subsystem 912. For example, the FBE uplink scheduling and control module 908 can be implemented by a combination of software components (e.g., executed by a DSP or a general processor) and hardware components (e.g., logic gates and circuitry) within the modem subsystem 912.

The FBE uplink scheduling and control module 908 may be used for various aspects of the present disclosure, for example, aspects of aspects of FIGS. 2-7 and 11. The FBE uplink scheduling and control module 908 can be configured to transmit a system information signal to a UE (e.g., the UEs 115 and/or 800) indicating an FBE mode of operation, transmit downlink control information (DCI) to a UE that does not schedule a physical downlink shared channel (PDSCH) communication for the UE, receive uplink communication(s) (e.g., PRACH, PUCCH, PUSCH communications) from the UE in response to the DCI, and/or communicate UL communications (e.g., PUCCH and/or PUSCH) and/or DL communications (e.g., PDCCH and/or PDSCH) with the UE.

As shown, the transceiver 910 may include the modem subsystem 912 and the RF unit 914. The transceiver 910 can be configured to communicate bi-directionally with other devices, such as the UEs 115 and/or 800, another BS 105, and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH) from the modem subsystem 912 (on outbound transmissions) or of transmissions originating from another source, such as a UE 115. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data) to the FBE uplink scheduling and control module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
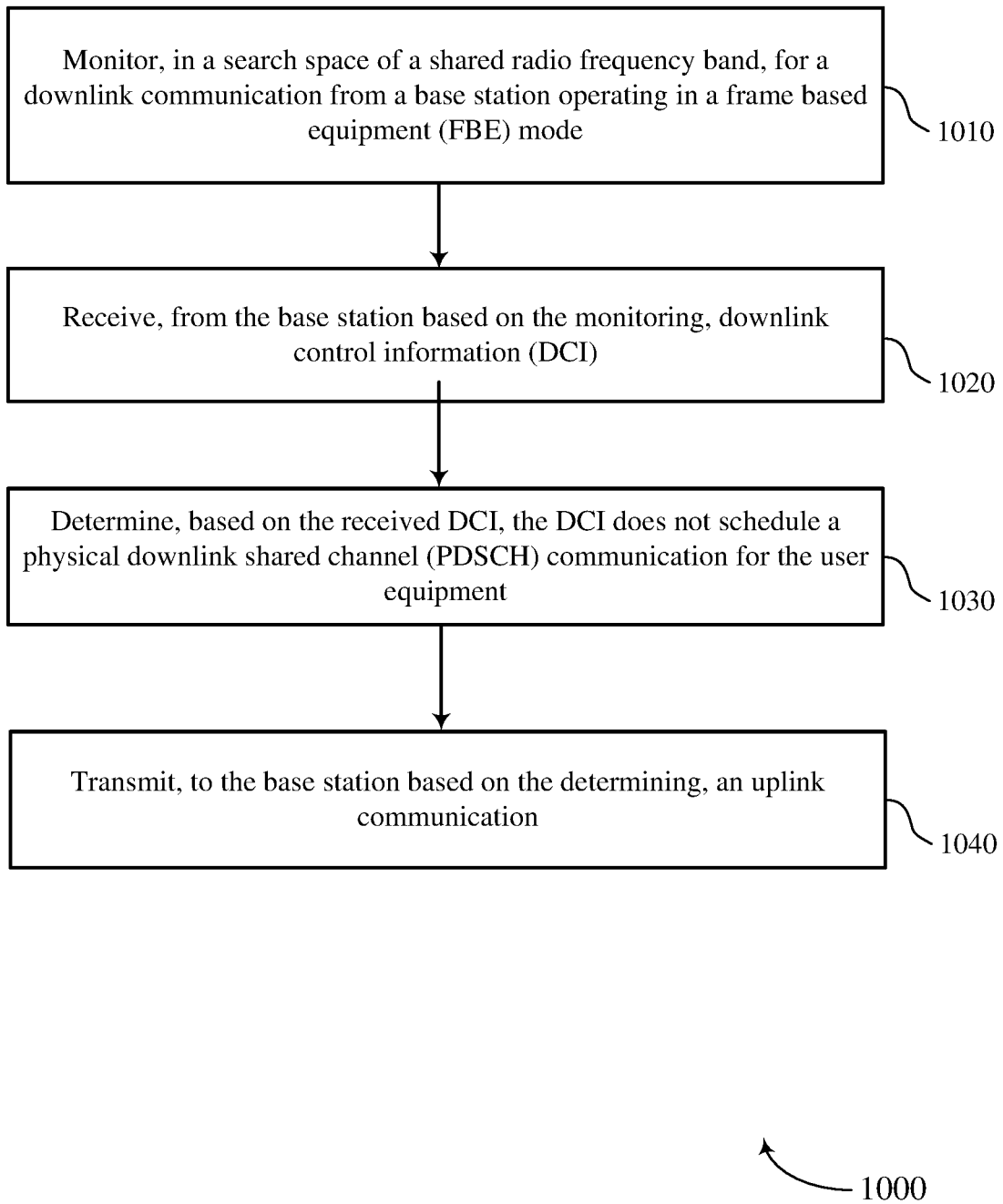
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a UE, such as UEs 115 and/or 800, may utilize one or more components, such as the processor 802, the memory 804, the FBE uplink scheduling and control module 808, the transceiver 810, and the one or more antennas 816, to execute the steps of method 1000. The method 1000 may employ similar mechanisms as described above with respect to FIGS. 2-7. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the UE monitors, in a search space of a shared radio frequency band, for a downlink communication from a base station operating in a frame based equipment (FBE) mode. In some instances, the UE operates in an idle mode while monitoring for the downlink communication. In some instances, the UE operates in an RRC connected mode while monitoring for the downlink communication. In some instances, the UE monitors for the downlink communication based on one or more predefined resource candidates. The predefined resource candidates may be defined based on a CORESET, search space (common, group-specific, and/or UE-specific), time resources, frequency resources, aggregation level, and/or combinations thereof. The predefined resource candidates may be set by a network specification, programmed in the UE's memory, and/or combinations thereof. The predefined resource candidates may be determined by a BS and communicated to one or more UEs through an RRC-configuration, a SIB, a MIB, and/or other signaling. In some instances, the UE monitors for the downlink communication in a common search space (CSS) of a physical downlink control channel (PDCCH). In some instances, the common search space is a Type 0 CSS. In some instances, the UE monitors for the downlink communication in a user-equipment specific search space (USS) of a PDCCH.

At block 1020, the UE receives, from the base station based on the monitoring at block 1010, downlink control information (DCI). The UE may receive the DCI masked with a system information radio network temporary identifier (SI-RNTI) (e.g., for an idle mode UE) or masked with a cell radio network temporary identifier (C-RNTI) (e.g., for a connected mode UE). In some instances, the UE receives the DCI in DCI format 1_0 masked with SI-RNTI. In some instances, the UE receives the DCI in DCI format 1_2 masked with C-RNTI or in DCI format 0_2 masked with the C-RNTI.

At block 1030, the UE determines, based on the DCI received at block 1020, that the DCI does not schedule a physical downlink shared channel (PDSCH) communication for the UE. In some instances, the UE determines the DCI does not schedule the PDSCH communication for the UE based on one or more fields in the DCI. For example, the value of one or more fields may indicate to the UE that a PDSCH communication is not scheduled. In some instances, the one or more fields includes a frequency domain resource allocation (FDRA) field. In this regard, the values of the FDRA field can indicate that the PDSCH communication is not scheduled for the UE (e.g., all zeros for RA Type 0, all ones for RA Type 1, etc.). In some instances, a combination of values across multiple fields of the DCI can indicate that the PDSCH communication is not scheduled for the UE. For example, the UE can decode the DCI and determine that the values of the multiple fields correspond to a set of values that indicate that a PDSCH communication is not scheduled for the UE.

At block 1040, the UE transmits an uplink communication to the base station based on the determination at block 1030 that the DCI does not schedule a PDSCH communication for the UE. In some instances, the UE transmits a physical random access channel (P-RACH) communication (e.g., a random access preamble (Msg1), a connection request (Msg3), a MsgA, etc.). In some instances, the UE transmits a physical uplink control channel (PUCCH) communication, a physical uplink shared channel (PUSCH) communication, a sounding reference signal (SRS), and/or another type of uplink communication.

Figure 11:
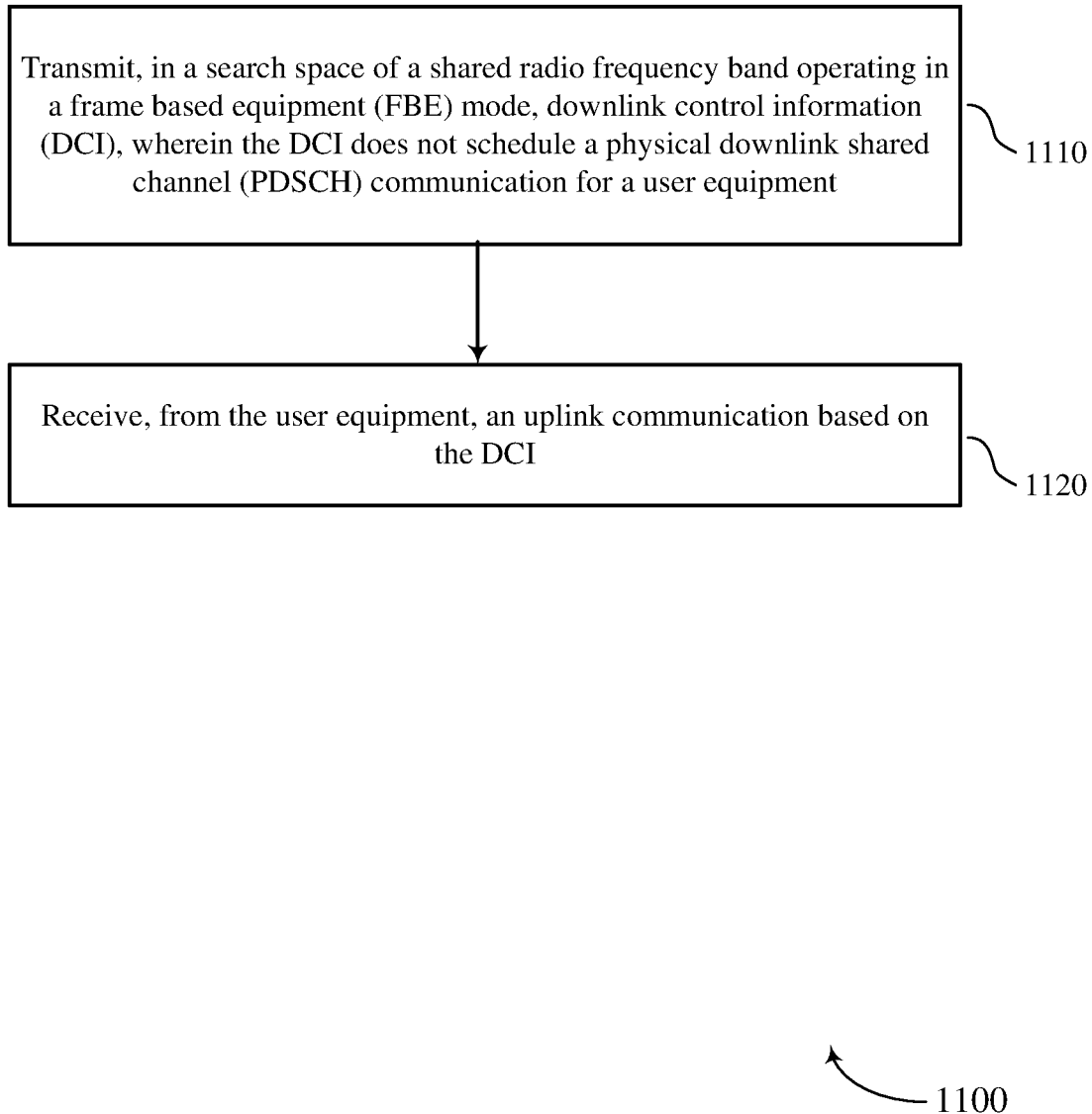
FIG. 11 is a flow diagram of a communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a BS, such as the BSs 105 and/or 900, may utilize one or more components, such as the processor 902, the memory 904, the FBE uplink scheduling and control module 908, the transceiver 910, and the one or more antennas 916, to execute the steps of method 1100. The method 1100 may employ similar mechanisms as described above with respect to FIGS. 2-7. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the BS transmits downlink control information (DCI) in a search space of a shared radio frequency band operating in a frame based equipment (FBE) mode. In some instances, the DCI does not schedule a physical downlink shared channel (PDSCH) communication for a UE. In some instances, the BS indicates that a PDSCH communication is not scheduled for the UE using on one or more fields in the DCI. For example, the value of one or more fields of the DCI may indicate that a PDSCH communication is not scheduled for a UE. In some instances, the one or more fields includes a frequency domain resource allocation (FDRA) field. In this regard, the values of the FDRA field can indicate that the PDSCH communication is not scheduled for the UE (e.g., all zeros for RA Type 0, all ones for RA Type 1, etc.). In some instances, a combination of values across multiple fields of the DCI can indicate that the PDSCH communication is not scheduled for the UE. In this regard, the values of the multiple fields can correspond to a set of values that indicate to a UE that a PDSCH communication is not scheduled for the UE.

In some instances, at block 1110 the BS transmits the DCI masked with a system information radio network temporary identifier (SI-RNTI) (e.g., for an idle mode UE) or masked with a cell radio network temporary identifier (C-RNTI) (e.g., for a connected mode UE). In some instances, the BS transmits the DCI in DCI format 1_0 masked with SI-RNTI. In some instances, the BS transmits the DCI in DCI format 1_2 masked with C-RNTI or in DCI format 0_2 masked with the C-RNTI.

In some instances, at block 1110 the BS transmits the DCI based on one or more predefined resource candidates. The predefined resource candidates may be based on a CORESET, search space (common, group-specific, and/or UE-specific), time resources, frequency resources, aggregation level, and/or combinations thereof. The predefined resource candidates may be set by a network specification, programmed in the BS's memory, and/or combinations thereof. The predefined resource candidates may be determined by the BS and communicated to one or more UEs through an RRC-configuration, a SIB, a MIB, and/or other signaling. In some instances, the BS transmits the DCI in a common search space (CSS) of a physical downlink control channel (PDCCH). In some instances, the common search space is a Type 0 CSS. In some instances, the BS transmits the DCI in a user-equipment specific search space (USS) of a PDCCH.

At block 1120, the BS receives an uplink communication from the UE based on the DCI. In some instances, the BS receives a physical random access channel (P-RACH) communication (e.g., a random access preamble (Msg1), a connection request (Msg3), a MsgA, etc.). The BS can transmit an appropriate response message (e.g., random access response (RAR) (Msg2), a connection response (Msg4), MsgB, etc.) to the UE in response to the P-RACH communication. In some instances, the BS receives a physical uplink control channel (PUCCH) communication, a physical uplink shared channel (PUSCH) communication, a sounding reference signal (SRS), and/or another type of uplink communication from the UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment, the method comprising:
    monitoring, in a search space of a shared radio frequency band, for a downlink communication from a base station operating in a frame based equipment (FBE) mode;
    receiving, from the base station based on the monitoring, downlink control information (DCI);
    determining, based on the received DCI, the DCI does not schedule a physical downlink shared channel (PDSCH) communication for the user equipment; and
    transmitting, to the base station based on the determining, an uplink communication.

2. The method of claim 1, wherein:
    the monitoring for the downlink communication includes monitoring in an idle mode for the downlink communication; and
    the transmitting the uplink communication includes transmitting a physical random access channel (P-RACH) communication.

3. The method of claim 2, wherein the receiving the DCI includes receiving the DCI in DCI format 1_0 masked with a system information radio network temporary identifier (SI-RNTI).

4. The method of claim 2, wherein the monitoring for the downlink communication includes monitoring for the downlink communication based on one or more predefined resource candidates.

5. The method of claim 2, wherein the monitoring for the downlink communication includes monitoring for the downlink communication in a common search space of a physical downlink control channel (PDCCH).

6. The method of claim 5, wherein the common search space is a Type 0 common search space.

7. The method of claim 1, wherein:
    the monitoring for the downlink communication includes monitoring in a connected mode for the downlink communication; and
    the transmitting the uplink communication includes transmitting at least one of a physical uplink control channel (PUCCH) communication or a physical uplink shared channel (PUSCH) communication.

8. The method of claim 7, wherein the receiving the DCI includes receiving the DCI in DCI format 1_2 masked with a cell radio network temporary identifier (C-RNTI) or in DCI format 0_2 masked with the C-RNTI.

9. The method of claim 7, wherein the monitoring for the downlink communication includes monitoring for the downlink communication based on one or more predefined resource candidates.

10. The method of claim 9, further comprising:
    receiving, from the base station, an indication of the one or more predefined resource candidates via a radio resource control (RRC) configuration.

11. The method of claim 7, wherein the monitoring for the downlink communication includes monitoring for the downlink communication in a user-equipment specific search space (USS) of a physical downlink control channel (PDCCH).

12. The method of claim 1, wherein the determining the DCI does not schedule the PDSCH communication for the user equipment includes determining the DCI does not schedule the PDSCH communication for the user equipment based on one or more fields in the DCI.

13. The method of claim 12, wherein the one or more fields includes a frequency domain resource allocation (FDRA) field, the FDRA field indicating that the PDSCH communication is not scheduled for the user equipment.

14. A method of wireless communication performed by a base station, the method comprising:
transmitting, in a search space of a shared radio frequency band operating in a frame based equipment (FBE) mode, downlink control information (DCI), wherein the DCI does not schedule a physical downlink shared channel (PDSCH) communication for a user equipment; and
receiving, from the user equipment, an uplink communication based on the DCI.

15. The method of claim 14, wherein:
the receiving the uplink communication includes receiving a physical random access channel (P-RACH) communication.

16. The method of claim 15, wherein the transmitting the DCI includes transmitting the DCI in DCI format 1_0 masked with a system information radio network temporary identifier (SI-RNTI).

17. The method of claim 15, wherein the transmitting the DCI includes transmitting the DCI using one or more predefined resource candidates.

18. The method of claim 15, wherein the transmitting the DCI includes transmitting the DCI in a common search space of a physical downlink control channel (PDCCH).

19. The method of claim 18, wherein the common search space is a Type 0 common search space.

20. The method of claim 14, wherein:
the receiving the uplink communication includes receiving at least one of a physical uplink control channel (PUCCH) communication or a physical uplink shared channel (PUSCH) communication.

21. The method of claim 20, wherein the transmitting the DCI includes transmitting the DCI in DCI format 1_2 masked with a cell radio network temporary identifier (C-RNTI) or in DCI format 0_2 masked with the C-RNTI.

22. The method of claim 20, wherein the transmitting the DCI includes transmitting the DCI using one or more predefined resource candidates.

23. The method of claim 22, further comprising:
transmitting, to the user equipment, an indication of the one or more predefined resource candidates via a radio resource control (RRC) configuration.

24. The method of claim 20, wherein the transmitting the DCI includes transmitting the DCI in a user-equipment specific search space (USS) of a physical downlink control channel (PDCCH).

25. The method of claim 14, further comprising:
setting one or more fields in the DCI to indicate that the PDSCH communication is not scheduled for the user equipment.

26. The method of claim 25, wherein the one or more fields includes a frequency domain resource allocation (FDRA) field.

27. A user equipment, comprising:
a transceiver; and
a processor in communication with the transceiver such that the transceiver and the processor are configured to:
monitor, in a search space of a shared radio frequency band, for a downlink communication from a base station operating in a frame based equipment (FBE) mode;
receive, from the base station based on the monitoring, downlink control information (DCI);
determine, based on the received DCI, the DCI does not schedule a physical downlink shared channel (PDSCH) communication for the user equipment; and
transmit, to the base station based on the determining, an uplink communication.

28. The user equipment of claim 27, wherein the transceiver and the processor are further configured to:
monitor for the downlink communication in an idle mode; and
transmit the uplink communication by transmitting a physical random access channel (P-RACH) communication.

29. The user equipment of claim 27, wherein the transceiver and the processor are further configured to:
monitor for the downlink communication in a connected mode; and
transmit the uplink communication via at least one of a physical uplink control channel (PUCCH) or a physical uplink shared channel (PUSCH).

30. The user equipment of claim 27, wherein the transceiver and the processor are further configured to:
determine the DCI does not schedule the PDSCH communication for the user equipment based on one or more fields in the DCI.

31. A base station, comprising:
a transceiver configured to:
transmit, in a search space of a shared radio frequency band operating in a frame based equipment (FBE) mode, downlink control information (DCI), wherein the DCI does not schedule a physical downlink shared channel (PDSCH) communication for a user equipment; and
receive, from the user equipment, an uplink communication based on the DCI.

32. The base station of claim 31, wherein the transceiver is further configured to:
receive the uplink communication by receiving a physical random access channel (P-RACH) communication.

33. The base station of claim 31, wherein the transceiver is further configured to:
receive the uplink communication via at least one of a physical uplink control channel (PUCCH) or a physical uplink shared channel (PUSCH).

34. The base station of claim 31, further comprising:
a processor in communication with the transceiver, the processor configured to set one or more fields in the DCI to indicate that the PDSCH communication is not scheduled for the user equipment.

* * * * *